United States Patent [19]

McCarty et al.

[11] Patent Number: 4,591,777
[45] Date of Patent: May 27, 1986

[54] MULTI-STATION MODULAR CHARGING SYSTEM FOR CORDLESS TOOLS AND APPLIANCES

[75] Inventors: George W. McCarty, Lutherville; Somers H. Smith, III, Columbia, both of Md.

[73] Assignee: Solid State Chargers Research & Development, Lutherville, Md.

[21] Appl. No.: 682,195

[22] Filed: Dec. 17, 1984

[51] Int. Cl.⁴ .................. H02J 7/00; H01M 10/46
[52] U.S. Cl. .................. 320/2; 15/DIG. 1; 310/50; 320/15
[58] Field of Search .................. 320/2–5, 320/21, 9, 15; 429/1, 7, 96–100; 15/DIG. 1; 30/DIG. 1; 310/50

[56] References Cited

U.S. PATENT DOCUMENTS

| | | | |
|---|---|---|---|
| 3,280,351 | 10/1966 | Wolter et al. | 320/2 X |
| 3,696,283 | 10/1972 | Ackley, III | 320/2 |
| 3,757,194 | 9/1973 | Weber et al. | 320/2 |
| 3,876,921 | 4/1975 | Bigbe, III | 320/21 X |
| 3,970,912 | 7/1976 | Hoffman | 320/2 |
| 4,096,428 | 6/1978 | Hanson et al. | 320/2 |
| 4,225,814 | 9/1980 | Gantz et al. | 320/2 |

Primary Examiner—R. J. Hickey
Attorney, Agent, or Firm—Leonard Boom

[57] ABSTRACT

A multi-station charging system is provided for charging batteries within a plurality of cordless tools, appliances or the like, each of which has at least one rechargeable battery therein. A plurality of modules, which act as charging stations, are arranged substantially adjacent to one another. Normally closed pairs of conductive contacts are provided in each of the modules. The electrical pairs of contacts in the modules are connected in a series circuit arrangement with each other. On one of the modules, electrical connection is provided to a single current regulated solid-state charging device which produces charging current pulses. The device may alternatively be in the one module. Each of the modules removably supports a respective tool or appliance and each tool or appliance has means for electrically connecting the respective battery therein within the series circuit arrangement and in series therewith only one wall outlet or a.c. power connection is required. Any combination of batteries per tool or appliance and any number of tools or appliances may be provided. Any number of the modules may be unoccupied. The modules are of standard construction, allowing charging of batteries or cells within many different tools and appliances provided with standardized connections.

34 Claims, 16 Drawing Figures

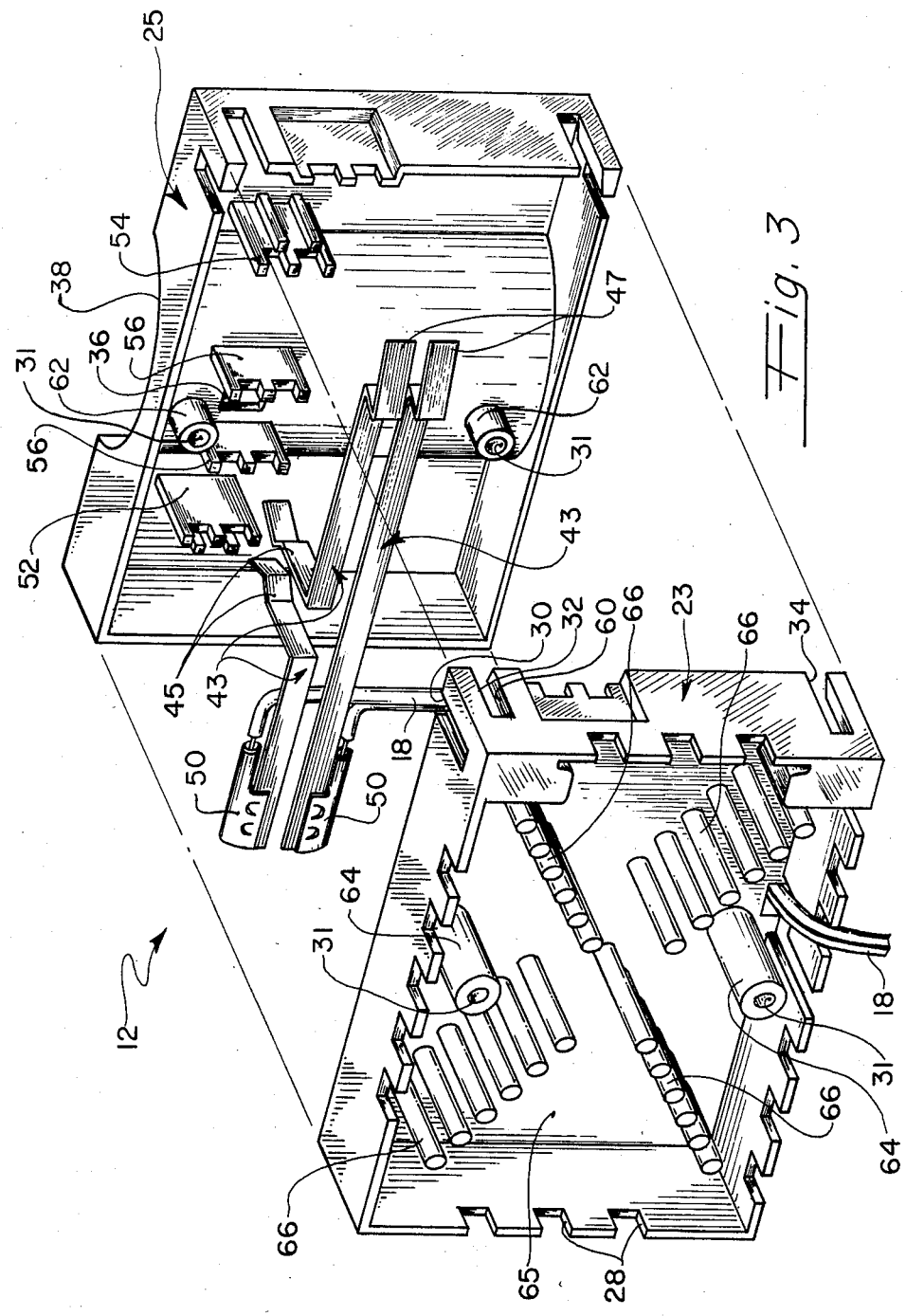

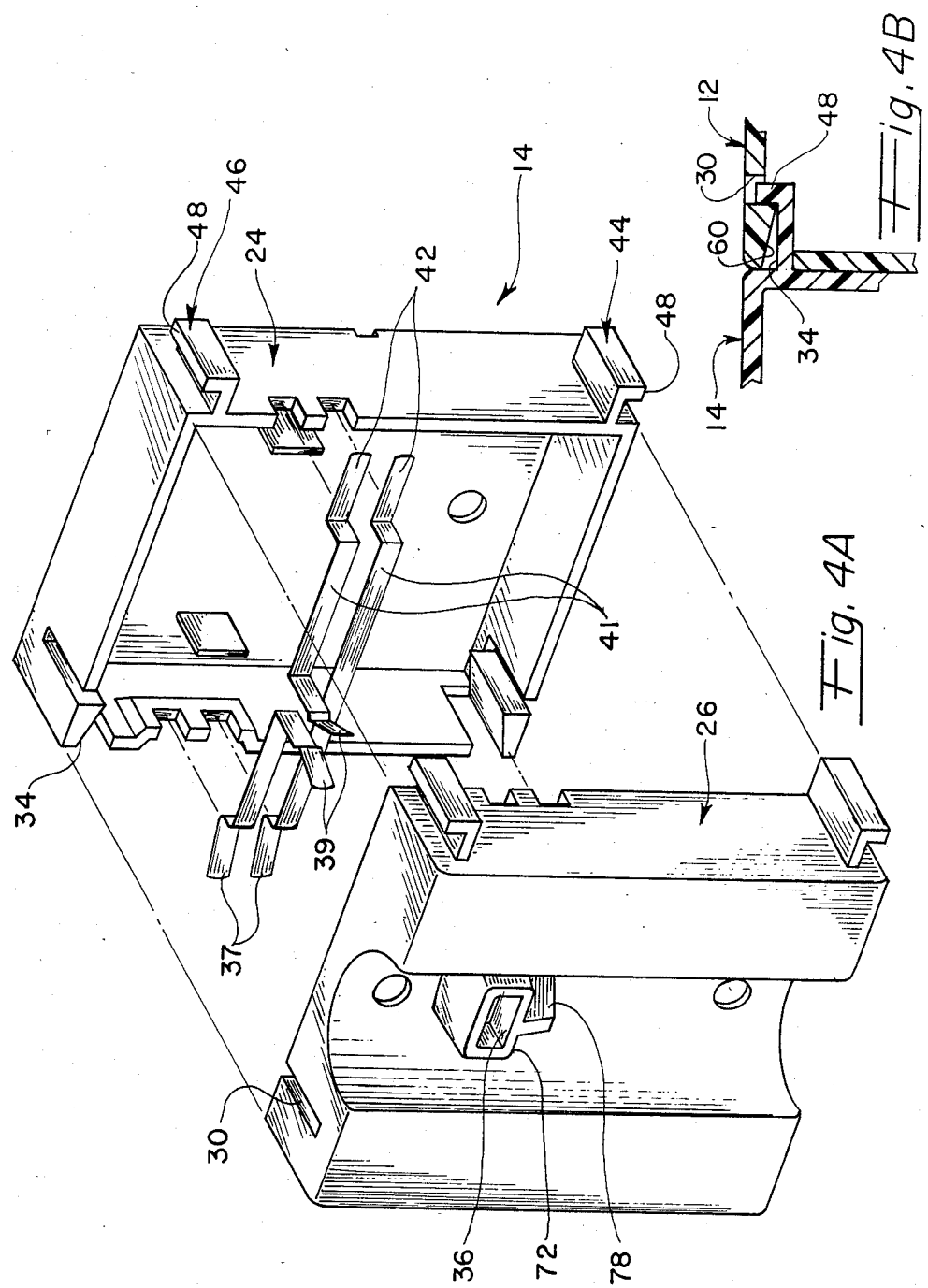

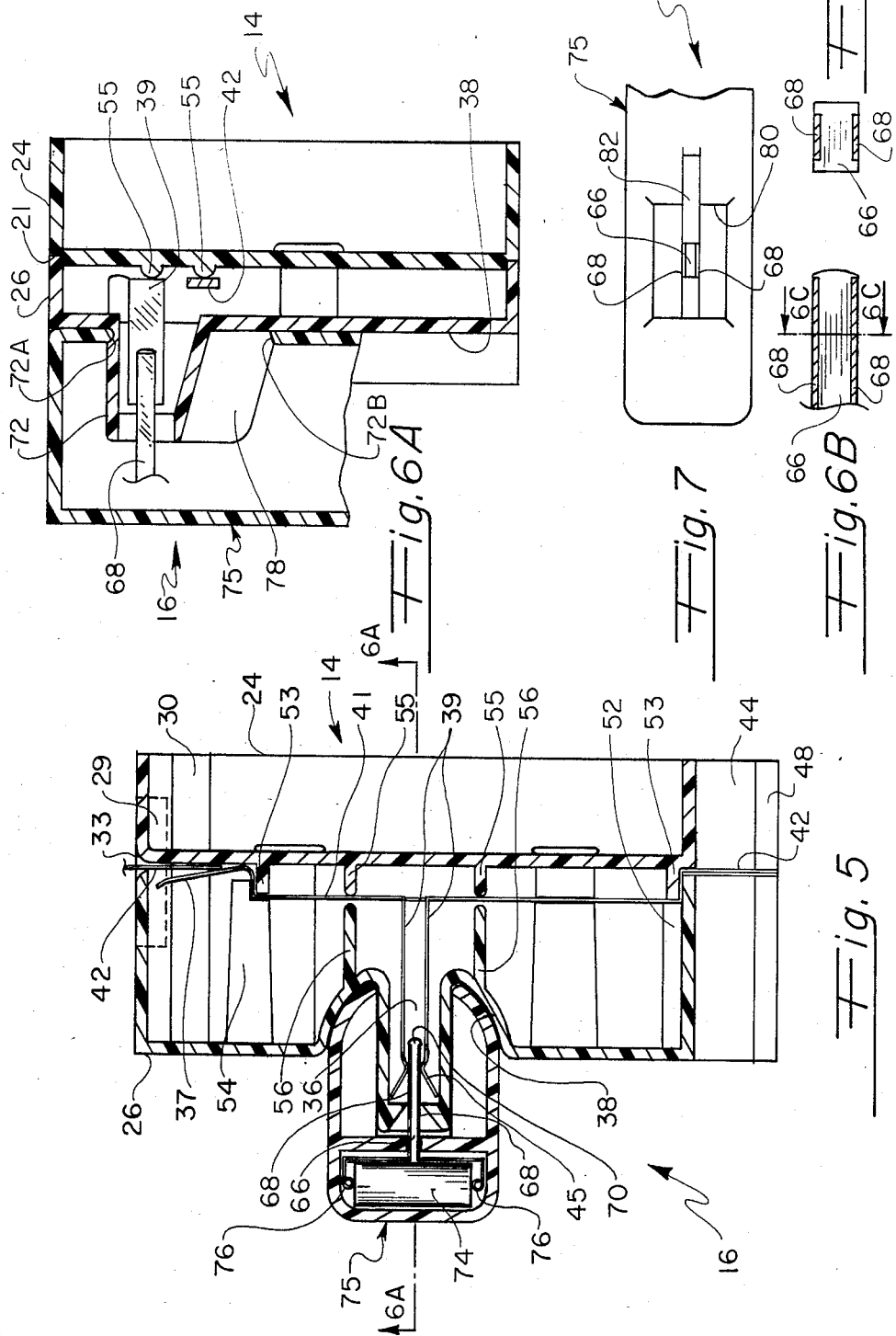

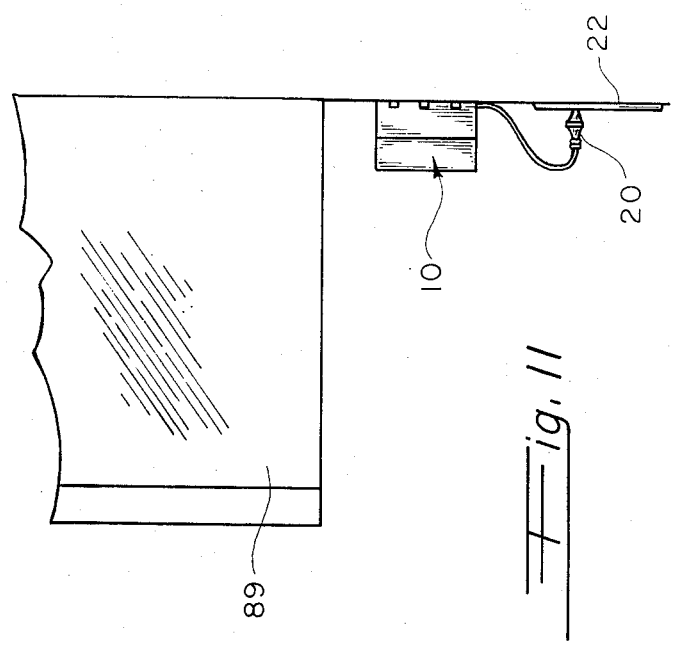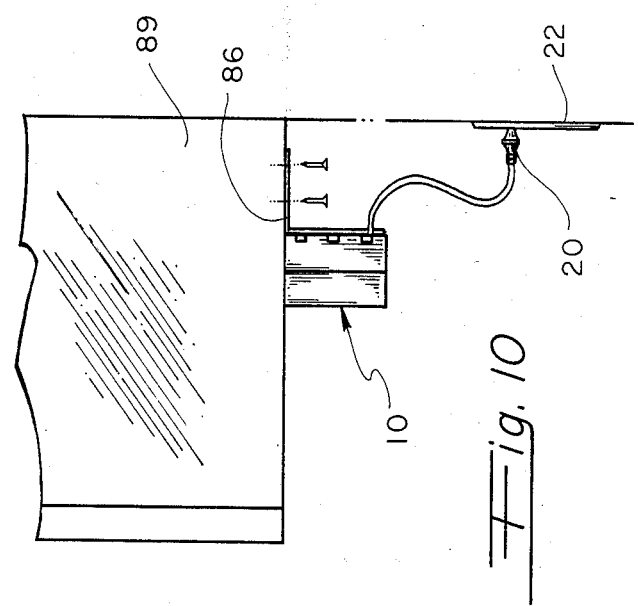

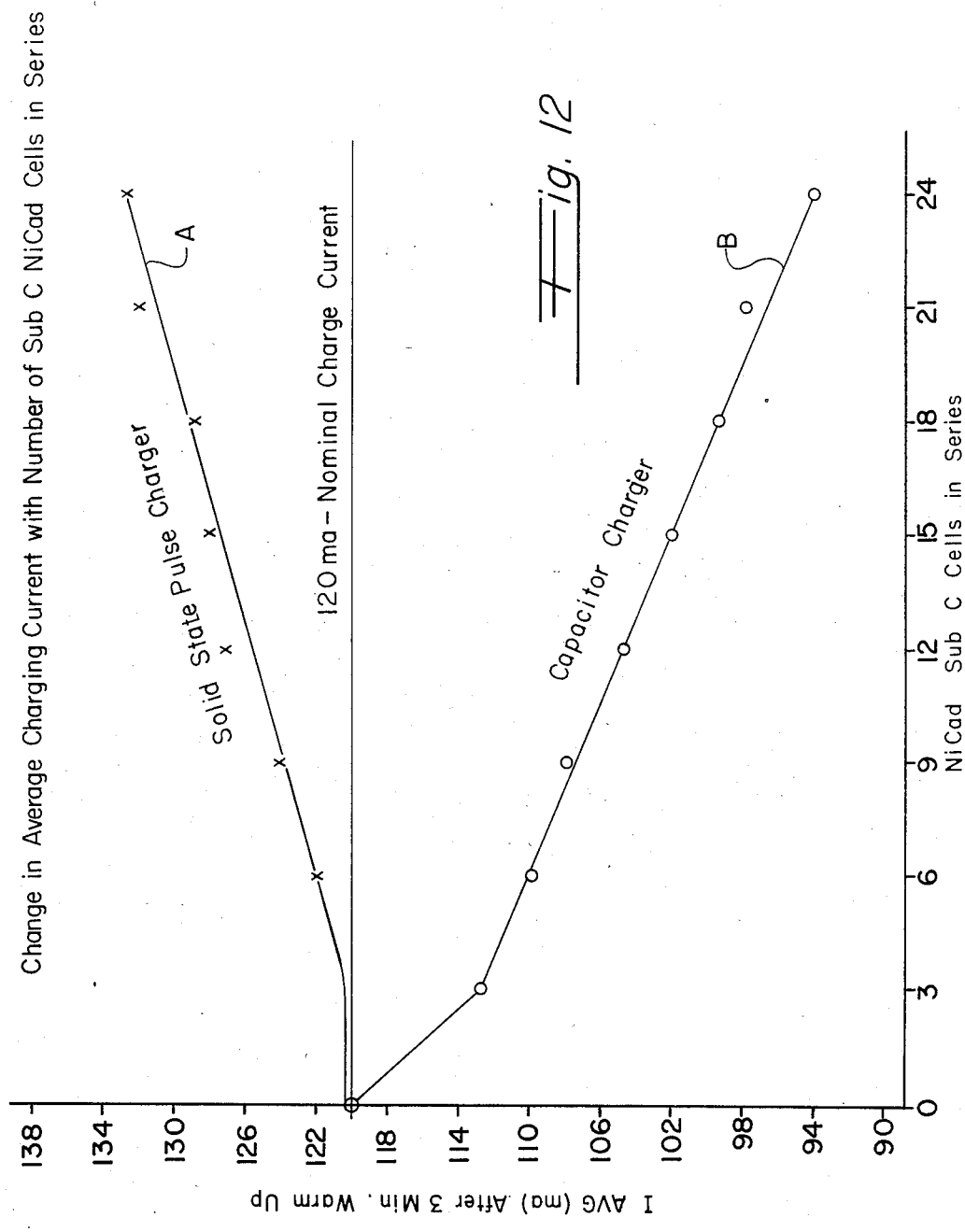

MULTI-STATION MODULAR CHARGING SYSTEM FOR CORDLESS TOOLS AND APPLIANCES

BACKGROUND OF THE INVENTION

The present invention relates to charging devices for battery operated, cordless tools, appliances and the like. Normally such devices are connected to a single tool or appliance for recharging via an AC power source. In other instances the tool or appliance carries its own recharging device together with a suitable cord for connecting it to a power source.

In today's household where a growing dependency on power tools and appliances is clearly in evidence, there is a need for storing such appliances in an orderly fashion, usually in a storage closet or in a kitchen, workshop area, garage, basement or the like. Since in many cases such tools and appliances are hung on a rack-like device or stored in an array of compartments or trays, the need for recharging such devices in an orderly and simple manner is desirable, especially if all of such appliances and tools can be charged at the same time by a common means or system in which selected tools or appliances can be removed for use without affecting the charging operation of the remaining tools and appliances and, further, wherein additional tools and appliances can be added into the charging system without changing that system.

SUMMARY OF THE INVENTION

It is a primary purpose and object of the present invention to address the aforementioned needs and therefore provide a multi-station modular charging system for a plurality of cordless tools, battery pack devices and appliances. In a preferred embodiment, up to a maximum of approximately twenty-four rechargeable cells is feasible consonant with the teachings of the present invention; and wherein if four cells are used per cordless device, then up to as many as six cordless devices may be connected to a single AC outlet. Other and ancillary objects of the present invention have for their purpose to provide a multi-station modular charger for charging a plurality of battery operated cordless tools, appliances on other devices in which the multi-station modular charger can be expanded upon or reduced by a desired number of modules, and in which each module within an array of modules cooperates with a tool or appliance to be charged as an independent unit so that a selected tool or appliance or battery holder device can be removed from the array without affecting the charging operation of the remaining tools or appliances. Further, the modules making up the system according to the present invention are identical with each other and are simple in design so as to afford ease and economy in their fabrication and simplicity in their operation and are virtually maintenance free. Further, each module can be marketed as a separate item associated with a particular appliance or tool. In addition the system may be easily mounted on a wall or suspended from a shelf or cabinet, using as many as six modules for single a AC outlet.

The invention provides, as well, for manufacturing standardization in the fabrication of the multi-station modular charger, thus enabling a high-volume low-cost production both for the charger system and the cordless device handles used with the charger system. Such standarization does not preclude, however, the custom design of a particular module and/or cordless device handle.

Specifically, the modular charger according to the invention provides a base modular unit having an electrical supply cord and a cord storage means therein together with a battery charging circuit component either stored within the base module or within the plug of the supply cord. A number of identical satellite units, which together form a linear array, can be removably plugged together and thereby extend from the base modular unit. Releasable latching means secure the modules together in abutting relationship with one another in the linear array laterally of the base charging module. Each satellite modular unit together with the base unit is provided with connecting contacts as well as a receptacle means for receiving a rod-like member extending from a respective tool or appliance to be charged. By means of a small removable circuit-closure plug which can be fitted to the end satellite module, the contacts for the entire array remain electrically in circuit, whether or not a tool or appliance operatively engages a receptacle in a particular charger module.

In a preferred embodiment, the battery charging circuit comprises a solid state pulse charger arranged to deliver a series of pulses for charging the batteries within the respective cordless tools, appliances or other devices.

The module for a multi-station charger is used with a cordless device which is normally provided with a handle. The module itself comprises a housing having outer walls including a front wall, a rear wall and a pair of side walls. The housing is formed by a pair of complementary mating portions joined together along a common mid-plane substantially parallel to the front and rear wall of the housing. Within the housing and substantially parallel to the mid-plane, are located a pair of contact strips which have respective portions extending beyond one of the side walls of the housing and are recessed within the other side wall. Hook or latching prongs, which are separate from the extending portions of the contact strips, extend from the one side wall of the housing. The other side wall of the housing has recessed detents formed therein for cooperative engagement with the latching prong of an adjacent module. The handle of the cordless device is supported on the front wall of the housing, and an electrical connection is made between the cordless device and at least one of the contact strips in the module.

The invention further provides a multi-station charger for charging a plurality of units from an alternating current source, wherein each of the units has a rechargeable battery therein. A plurality of charging stations are arranged substantially adjacent to one another, and electrical contact means are provided in each of the charging stations. The electrical contact means in the adjacent charging stations are connected in a series circuit arrangement with each other. On one of the charging stations, the electrical contact means is connected to the current source by means of a solid-state charging device. This solid-state charging device has a current regulating circuit and generates a series of current pulses, each of which is less than half of the alternating current waveform. Each of the charging stations removably supports a respective unit, and each unit has means for electrically connecting the respective battery therein within the series circuit arrangement.

In another aspect, the present invention sets forth the combination of a unit having a rechargeable battery therein, and a charger means having a protuberance thereon, the protuberance having an opening therein. Suitable electrical contact means are within the charger means. The unit has a recess formed therein complementary to the protuberance, such that the unit substantially envelops the protuberance and is in substantial mechanical registry therewith. A contact carrying member is within the unit and extends through the opening in the protuberance to engage the contact means in the charger means.

These and other objects of the present invention will become apparent from a reading of the following specification taken in conjunction with the enclosed drawings.

BRIEF DESCRIPTION OF THE DRAWINGS

FIG. 3 is a rear exploded view of the base modular unit, the rear housing part being laterally reversed to show the cord storage means therein;

FIG. 4A is a front exploded view of a satellite module;

FIG. 4B is a detailed view of the latching means connection;

FIG. 5 is a section view, taking across the lines 5—5 of FIG. 1A, a satellite module in an operative engagement with the handle of a cordless device, and further showing an extension member on the cordless device supporting the contact elements in the module and making electrical engagement therewith.

FIG. 6A is a sectional view taken along the lines 6A in FIG. 5;

FIG. 6B is an enlarged portion of the extension or rod member on the cordless device, FIG. 6C is a section view, taken across the line 6C—6C of FIG. 6B;

FIG. 7 is a plan view of a portion of the handle of a cordless device;

FIG. 10 is a schematic illustration of an under-the-cabinet mounting of the multi-station modular charger of the present invention;

FIG. 11 is a schematic illustration of a wall mounting of the multi-station modular charger of the present invention; and FIG. 12 is a graph depicting the performance of the preferred system of the present invention as distinguished from a capacitor type of charging circuit, and showing the average charging current per number of battery cells in series.

GENERAL DESCRIPTION OF THE PREFERRED EMBODIMENT

Figure 1A:
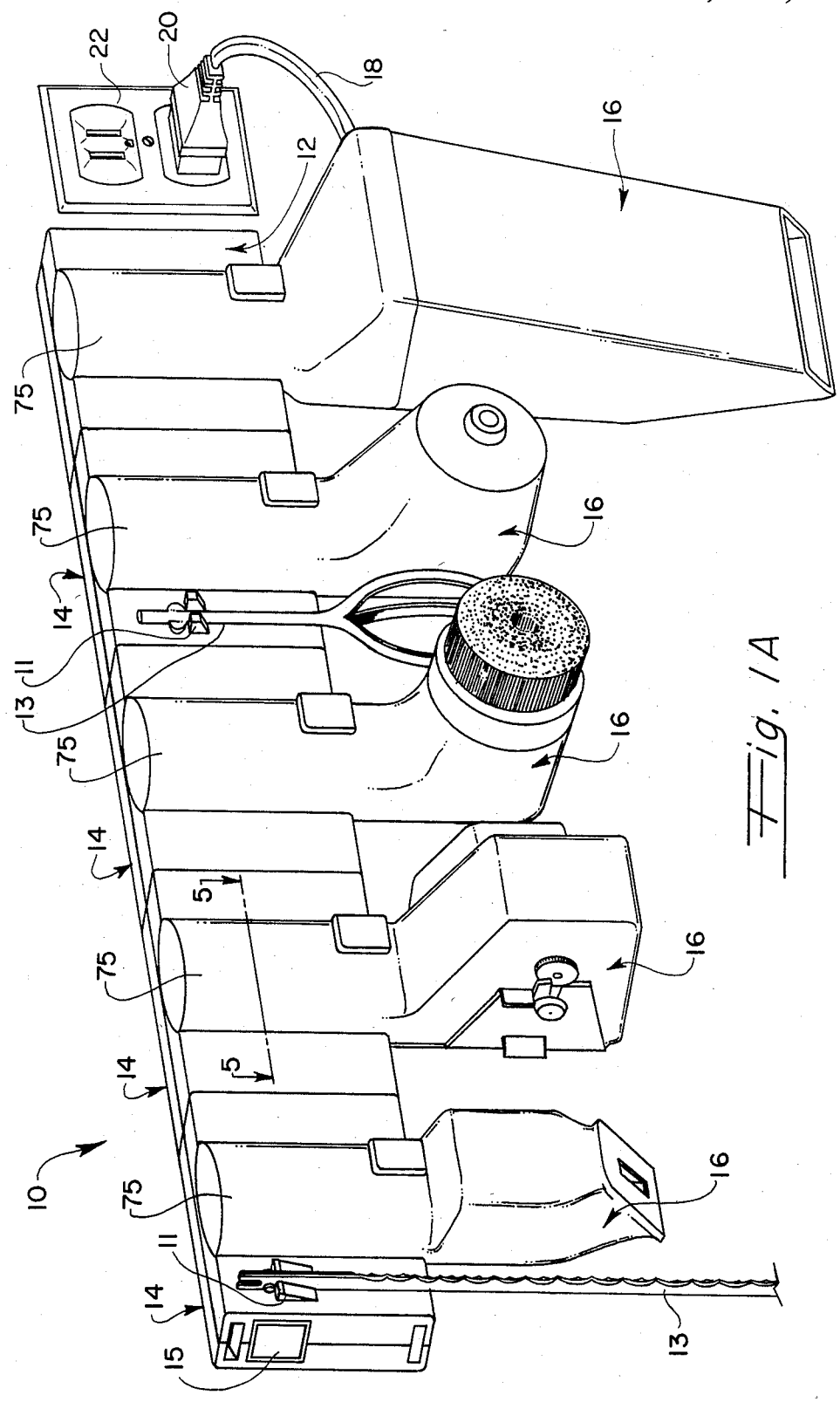
FIG. 1A is a perspective view of a preferred embodiment of the present invention in an assembled form ready for operation, showing a plurality of individual cordless tools or appliances mounted upon the multi-station modular charger.

Referring to FIG. 1A, there is shown the assembled multi-station modular charger 10 arranged on a wall surface, not shown. A base modular charger unit 12 is shown at the right of the figure, and a plurality of satellite modular charger units 14 are shown connected in a linear array extending to the left from the base unit 12. Connected to each of the modular units including the base unit is a battery-operated power tool, appliance, or other cordless device 16 having a handle 75, as shown, which not only will be stored when not in use but will receive a charge from the modular charging device 10 according to the invention. Additionally, supports 11 may be provided on the modules for holding tool parts 13 and the like. A circuit-closing end plug 15 completes the series circuit formed by all the modules. Also shown is a power cord 18 connected to the base modular unit 12, having a plug member 20 for cooperation with a suitable AC outlet receptacle 22. It should be understood that the base modular unit 12 may be positioned at the left of the figure and the modular satellite units 14 can extend therefrom to the right. In this case the cooperative parts to be described below will be reversed, that is, form a mirror image with respect to the former arrangement in the respective charger modular housings. If the AC outlet 22 is positioned to the left of the array 10, as shown, and the system 10 extends to the left as well then the power cord can be neatly secured under the array by means of suitable clips, not shown, depending from the respective housings 14.

As shown in FIG. 1A, and from left to right therein, the cordless products may consist (for example) of an electric knife, a can opener, a polisher or scrubber, a mixer, and a vacuum cleaner. These cordless products are primarily intended for kitchen use; however, the present invention is equally applicable to a wide variety of cordless devices or separable battery packs for use in the home or workshop or for industrial or commercial usage.

Figure 1B:
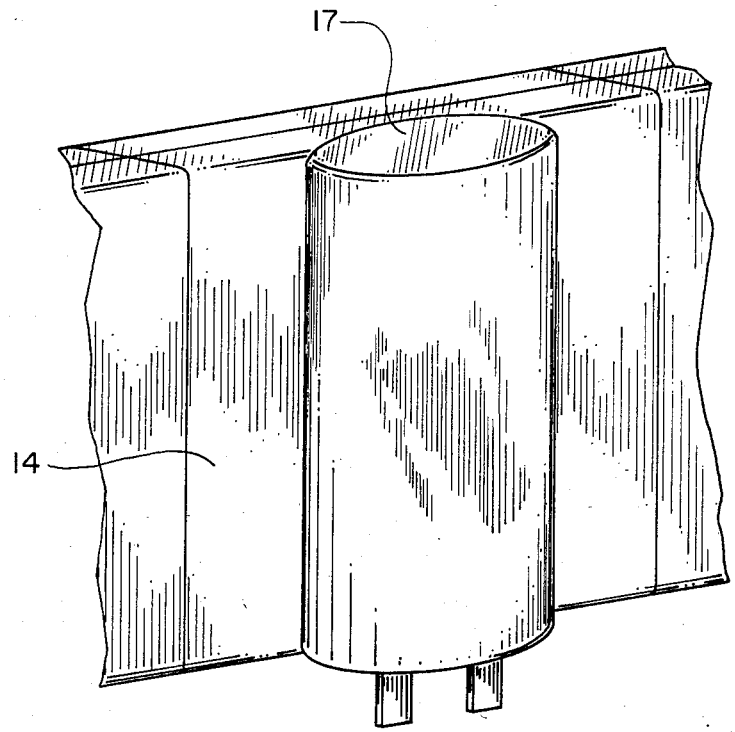
FIG. 1B is a perspective view, corresponding to a portion of FIG. 1A, but showing one of the modular chargers for charging a separate battery pack as distinguished from a cordless tool or appliance.

In FIG. 1B a portion of one of the satellite modular units 4 of, the system 10 is shown supporting a battery pack device 17, which is normally used as a power source in other cordless appliances and tools.

Figure 2:
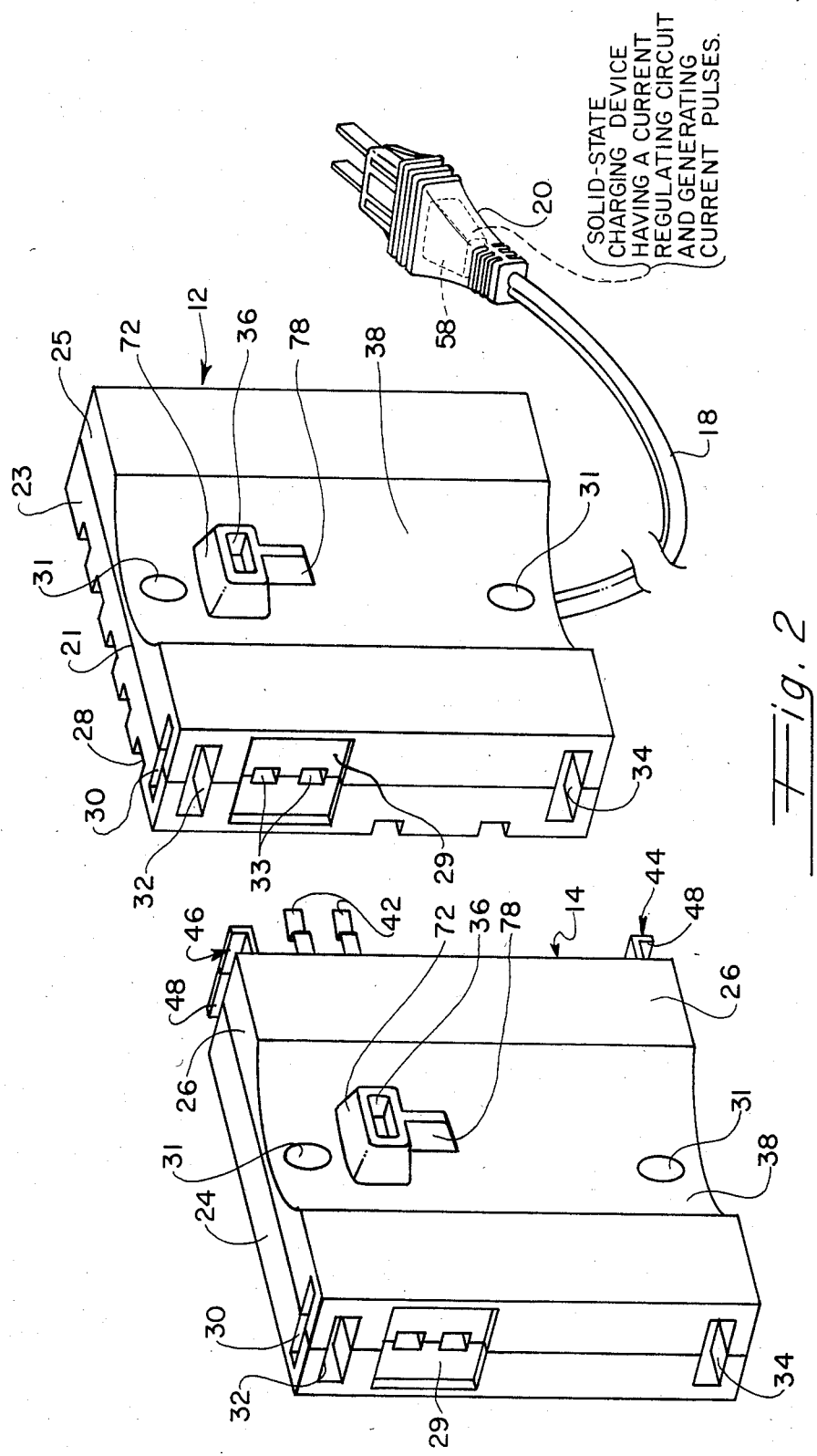
FIG. 2 is a perspective view of one of the modular satellite units separated from the base modular unit.

In FIG. 2 the base modular unit 12 and one of the satellite modular units 14 are shown in greater detail. The base modular unit comprises two housing parts 23 and 25 which form a "clamshell" type of housing in which complementary mating portions of the two housing parts join at a common mid-plane 21 parallel to the front and rear faces of the respective housing parts. The rear housing part 23 is provided with notches 28 around its perimeter to provide ventilation openings for cooling purposes. Additionally, the cord 18 can emanate from any one of the notches 28 at any desired location on the perimeter of the base charger module. The front housing 25 has access holes 31 therein to allow suitable fastener means (such as screws or mollys) to secure the unit to a wall surface. Within a scalloped portion 38 of the face plate or front housing 25 is a further opening 36 for receiving an extension member from the tool or appliance, to be described in detail below. At the left side of the base modular unit 12, as shown, are a pair of spaced apart slots 32, 34 at the top and bottom, respectively which cooperate respectively with a slot 30 and a similar slot (not visible in FIG. 2) in the bottom wall. Between these slots 32, 34, located in the upper portion of the unit, is another pair of slots 33 arranged within a recessed portion 29 in a vertical alignment (see also FIG. 1B).

The satellite modular unit 14 also has two housing parts 24, 26, and the face plate portion has access holes 31 and an opening 36 in a scalloped portion 38 thereof, similar to that described above for the base modular unit 12. To the left of the satellite module, the slot construction is shown to be similar to that described for the base unit 12, there being provided spaced apart slots 32, 34, and in between these the slots 33 vertically aligned along the mid-plane between the two housing parts 24,26. To the right of the module 14 there is shown extending from the top and bottom portions, respectively, a pair of tongue members 44, 46, having detent portions 48, and in between these a pair of contact prong members 42 adapted to engage the slots 33 of an adjacent module.

Thus, the tongue member 46 is designed to enter the slot 32, and the tongue member 44 is designed to enter the slot 34, in order to secure the satellite module 14 in removable locking engagement with the base modular unit 12, which feature will be described in greater detail below. Also shown in FIG. 2 is a pulse current producing battery charging-circuit in a component 58 housed within the power plug 20. The charging circuit component 58 may also be mounted within the base modular unit 12, if desired, and is arranged to generate a series of pulses for charging the batteries in the respective cordless tools or appliances. The charging device 58 is preferably a solid-state charging device produced as an integrated circuit (or "I.C.") and constitutes a current regulating circuit for generating a series of current pulses, each of which is less than half of the alternating current waveform. An example of a suitable circuit for producing these pulses is disclosed and claimed in the co-pending Holland application, Ser. No. 643,299, filed Aug. 22, 1984, entitled "CURRENT PULSE PRODUCING CIRCUIT", and assigned (by Mesne Assignment) to the assignee of the present invention, the disclosure for which is incorporated herein by its entirety.

In FIG. 3 the base modular unit is shown with the two housing parts 23, 25 separated from each other in order to show the contact members 43. These contact members 43 comprise a parallel pair of ribbon-like strips of conductive material, brass, for example, in which the upper member is shown to have a break therein defined by two laterally extending prong members 45. Each prong member is resiliently biased towards the other and is provided with an indented portion normally in contact with one another. The power supply cord 18 is shown to have suitable contact slide members 50 for engaging the respective ends of the contact strips 43, while the other ends 47 are bent or biased away from the longitudinal axes of the strips 43, having upturned end portions which provide a contact receiving surface in the proximity of the slots 33 formed in the side of the housing part 25 within the recess 29. In order to secure or trap the contact strips within the housing, upstanding slotted members or lands 52, 54 and 56 are provided within the interior of the housing 23, as shown, as well as corresponding lands (not shown) in the housing 23, and preferably are molded integrally with the housing from a suitable plastic material. Contact strips 43, when positioned by the lands 52, 54, 56, allow prongs 45 to enter the opening 36 in their normally contact-closing position. Bosses 62 are molded within the front housing part 25 and cooperate with bosses 64 molded within the rear housing part 23, thereby providing the access holes 31 for mounting the base modular unit 12. The rear housing part 23 has a face plate 65, which is provided with a series of upstanding post members 66 forming a generally X-configuration. These posts 66 are so spaced apart from each other so as to allow the power cord 18 to be wrapped around the various posts in order to take up any excess slack in the cord when in use. Also shown on the right side of the housing part 23 are the slots 32, 34. Each of these slots, as shown more clearly in FIG. 4B, is provided with a sloped portion 60, the inner edge of which defines a detent portion. The corresponding detent portions 48 of the respective tongue member 44, 46 extending from a satellite module snap past the sloped surface 60 of the respective recesses 32, 34 for locking engagement when the modules 12 or 14 (or two of the same modules 14) are fitted together. An access hole 30 is provided adjacent each detent portion 60 so that the detent 48 can be depressed for disassembly, as best shown in FIG. 4B.

In FIG. 4A there is shown an exploded view of one of the satellite modules 14 showing the arrangement of the contact strips 41. The upper strip is broken at the middle portion, similar to the contact strip 43 in the base module 12, and defines therefor laterally projecting prongs 39, similar to prongs 45 in the base module 12, adapted to be received within the opening 36 on the front face of the housing part 26. The strips 41 have extending contact prongs 42 at one end thereof, and at the other end thereof there are bent portions or receiver prongs 37. The contact strips are fitted to lands or slotted members contained within the front housing part 26 in the same manner as described and shown in FIG. 3 for the base module 12. When two satellite modules are fitted together, the extension prongs 42 of one module will enter the slots 33 of the adjacent module and thereby slide past and come in contact with the receiver prongs 37 within that particular module, while at the same time, of course, the tongue member 46, 48 lockingly engage their respective slots 32, 34, as previously described.

In FIG. 5 the handle 75 of a tool or appliance is shown fitted into the scalloped portion 38 of a typical satellite module 14. As shown, the handle 75 includes a generally recessed portion 80 (see FIG. 7) which fits over the boss or protuberance 72 having the opening 36 therein (see also, FIGS. 2, 3 8 and 7).

The handle 75 may be provided with suitable guide ribs (shown in FIG. 5) for facilitating the sliding movement of the handle over the protruding boss 72. The top surface of the boss 72 may be generally horizontal, while the bottom surface may be tapered as shown more clearly in FIG. 6A. The top and bottom surfaces of the boss 72 may be provided with indentations 72A and 72B, respectively, so that the corresponding respective edges of the handle may ride along the top and bottom surfaces of the boss 72 and may then be received into the respective indentations with a detent or "snap action", thereby removably retaining the handle 75 of the cordless device 16 on the respective charging module (12 or 14).

Centrally positioned within the recess 80 and extending from a non-conductive block member 74, is a non-conductive extension or rod member 66 having conductive strips or contacts 68 on either side thereof as shown more clearly in FIGS. 6B and 6C. The rod member 66 acts to separate the leaves or prongs 39 or 45 (depending on which module is being used) which are normally in contact with one another and thereby places each of the prongs 39 or 45 in contact with a respective contact strip 68 on either side of the rod member 66, as shown. The contact strips 68 extend, respectively, to either side of the block 74 and make contact with suitable conductive posts 76 associated with the battery, not shown, in the tool or appliance 16. Also, the contact strips 41 are shown secured in place by lands 52, 54, 56 in the front housing 26 and corresponding lands or supports 53, 55, in the rear housing 24 of each module. When both front and rear housings are joined by heat welding methods, the aforesaid lands or supports become juxtaposed by virtue of their respective locations to trap and hence secure the strips 41 therebetween.

FIG. 6A shows the handle 75 of the tool or appliance 16 in position within the scalloped portion 38 of the satellite module 14. The protrusion 72 together with the flange 78 (see FIGS. 2 and 4A) are received in the recess of the handle of the cordless device 16.

In FIG. 7, the handle is shown separately in a plan view wherein the rod member 66 with the contact strips 68 on either side thereof is shown in a central position with respect to the recess 80. The slotted area 82 extending from the recess 80 is designed to slide past the flange 78, as best shown in FIG. 4A and 6A.

Figure 8:
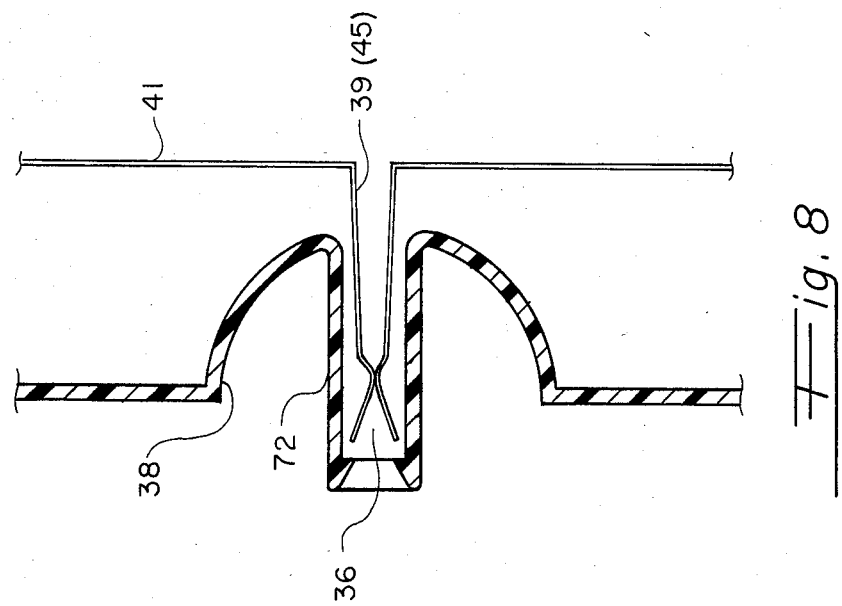
FIG. 8 is a portion of FIG. 5, drawn to an enlarged scale, and showing the resiliently-biased contact elements in their normally closed position.

FIG. 8 is a top view illustrating the removal of the handle of the tool or appliance 16 from the modules 12 and 14. In such cases the prongs 45 (or 39) will close on one another, thus closing the circuit for that module from which the tool is removed.

Figure 9:
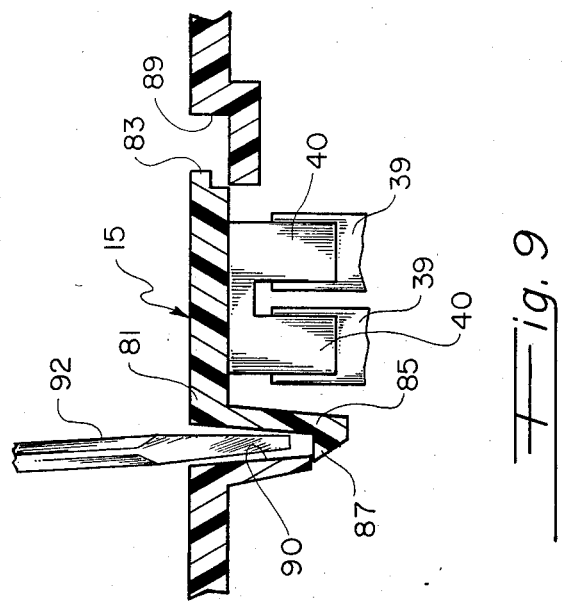
FIG. 9 is a detailed view of the circuit-closure plug for the system according to the invention.

In FIG. 9 the circuit-closure plug 15 is shown having a pair of conductive closure contacts 40 extending from its base 81 in order to make contact with the respective prongs 39 in a module housing (or respective prongs 45 in a base module). The plug 15 fits neatly into the recess 89 in the side of each module for that purpose. The base 81 of the plug 15 is provided with a flange portion 83 on one side thereof and an extended flange 85 having a detent portion 87 on the opposite side thereof. The detent 87 slides down a corresponding flange or sidewall 90 of the associated module and snaps past the edge thereof to make a locking engagement. Meanwhile the flange 83 of the base 81 allows the plug 15 to be seated within the recess 29 as shown. Because the dimensions of the base 81 are smaller than that of the recess 29, a space will be provided on both sides of the base to allow a screwdriver 92 or the like to be inserted therein in order to pry loose the detent 87 for the purpose of removing the plug 15. It will be understood that the plug 15 can be inserted into any one of the modules, including the base module.

When the multi-station modular charging device according to the invention is assembled, as shown in FIG. 1A, the satellite modules 14 will be locked together in the manner already described with the respective contacts 37, 42 making contact through the slots 33, as shown at the top of FIG. 5, including the plug 15. If a tool or appliance 16 is in place, that is, its handle secured to the module, as shown in FIGS. 1 and 5, the rod member 66 will separate the normally closed prong contacts 39, putting each of these in contact with the contact strips 68 associated with the battery charging circuit of the cordless tool or appliance, as shown in FIG. 5. The tool or appliance will then be recharged while it is in its stored position.

Should the tool or appliance be removed for use elsewhere, the prongs 39 (or prongs 45 if the base module is in use) will resume their usually closed position, thereby maintaining a closed circuit. It will be understood from the above that the series circuit defined by the conductor strips 41 in the satellite modules 14, strips 43 in the base module 12, and closure strips 40 in the plug 15 are continuously in series; that is, the circuit is never broken by removing either one or all of the tools or appliances from the multi-station array 10, since the prongs 39 (or 45) are in contact with contacts 68 on the rod member 66 of the associated tool or appliance, or they are in contact with each other. Further, as cordless tools or appliances are added to the system, they can be introduced into the multi-station charger 10 by simply adding on a satellite module 14. Also, a preferred embodiment of the present invention simplifies the battery charging circuit by needing only one battery charging circuit 58 for up to as many as six battery operated cordless devices to be charged, or, on the other hand, up to as much as 24 cells in a cell-holder device or devices. This particular arrangement avoids the necessity of having a separate battery charging circuit for each tool or appliance or, in the case of separate charging stations, at each battery charging station. Whenever no tool or appliance is present on the modules, all of the prongs 39, 45 are closed causing a metallic, conductive short across the current pulse producing circuit 58; nevertheless, no damage is done because of the impedance of the circuit 58, which limits the magnitude of the current.

As shown in FIG. 10, the multi-station modular charger 10 of the present invention is mounted under a cabinet 89 by means of an auxiliary L-shaped member 86. Thus, the booses 64 of each module are used to secure the L-shaped member 86 to the rear face of the module, and then the upper leg of the L-shaped member can be secured to the underside of the cabinet 89 by suitable bolts or screws. In FIG. 11, the multi-station modular charger 10 is mounted in a wall adjacent to a cabinet. However, any convenient mounting is feasible consonant with the teachings of the present invention.

FIG. 12 is a graph illustrating the performance in terms of charging current vs. number of cells of the solid state pulse charger according to the invention and as used in the multi-station modular array as herein described versus a conventional capacitor charger. It will be seen that the charging current for the system according to the invention, marked as A on the graph, increases as the number of cells increases in number, in this case twenty-four. As shown, the cells are conventional NiCad Sub C cells connected in series. In the conventional charger using well known capacitor discharge methods, the average charging current actually decreases as the number of cells being charged in series increases.

Obviously, many modifications may be made without departing from the basic spirit of the present invention. Accordingly, within the scope of the appended claims, the invention may be practiced other than has been specifically described therein.

What is claimed is:

1. A multi-station modular charging system for charging a plurality of units, each of which has at least one rechargeable battery therein and at least one electric contact means therein for conducting d.c. current to the at least one rechargeable battery, the charger comprising an electrically conductive series circuit having a plurality of normally closed pairs of contacts in electrical series with each other, a power source, a charging means receiving current from said power source and being connected to said electrically conductive series circuit, a plurality of substantially identical modules for completing said electrically conductive series circuit, each of said modules having therein at least one pair of said plurality of normally closed pairs of contacts, each of the units having a respective said at least one electrical contact means connected to the respective at least one rechargeable battery therein, and each of said modules having a releasable connection means for incorporating the respective electrical contact means of respective said units into said electrically conductive series circuit via respective pairs of said normally closed pairs of contacts by effecting opening thereof; whereby rechargeable batteries within the units may be placed in series with said electrically conductive series circuit and each other to be charged by the d.c. current flowing in the series circuit.

2. A charging system according to claim 1, wherein one of said modules is a base module having a conductor cord means connected to said power source.

3. A charging system according to claim 2, wherein said charging circuit is disposed in said base module.

4. A charging system according to claim 2, wherein said charging circuit is disposed in a portion of said conductor cord means.

5. A charging system according to claim 4, wherein said charging circuit comprises a solid-state device generating a series of pulses to charge the respective batteries in the units.

6. A charging system according to claim 2, wherein said base module includes a means for storing an excess portion of said conductor cord means.

7. A charging system according to claim 1, wherein each of said modules includes latching means for securing said modules in abutting relationship with one another in a linear array thereof.

8. A charging system according to claim 1, wherein said series circuit includes a pair of conductor strips in each of said modules.

9. A multi-station modular charging system for charging a plurality of units, each of which has a rechargeable battery therein, comprising a series circuit, a power source for said circuit, a charging means connected to said series circuit, a circuit-closing means, a plurality of substantially identical modules for completing said series circuit, each of the units having a contact means connected to the respective battery therein, and each of said modules having a releasable connection means for incorporating the respective contact means into said series circuit, wherein said series circuit includes a pair of conductor strips in each of said modules, and wherein said releasable connection means comprises one of said conductor strips defining a pair of normally-closed contact prongs.

10. A charging system according to claim 9, wherein said contact means in at least one of units comprises a rod member having respective contacts for engaging said contact prongs.

11. A multi-station modular charging system for charging a plurality of units, each of which has a rechargeable battery therein, comprising a series circuit, a power source for said series circuit, a charging means connected to said series circuit, a circuit-closing means, a plurality of substantially identical modules for completing said series circuit, each of the units having a contact means connected to the respective battery therein, and each of said modules having a releasable connection means for incorporating the respective contact means into said series circuit, wherein said series circuit includes a pair of conductor strips in each of said modules, and wherein said circuit-closing means comprises an end plug including a pair of closure contacts, said end plug having a detent means for being releasably received in a recessed portion adjacent said pair of conductor strips of one of said modules for contacting said pair of conductor strips.

12. A multi-station charging system for charging a plurality of units from an A.C. power source, each of the units having a rechargeable battery therein, comprising a base module having a conductor cord means connected to the power source, a solid-state charging means associated with the base module and generating a series of pulses for charging the respective batteries in the units, at least one satellite module, latching means for removably securing the satellite module in abutting relationship with the base module laterally thereof in a linear array, each of the modules having respective pairs of conductive strips, means for connecting the respective pairs in series as the modules are removably secured together, means including a circuit-closing plug means removably secured to the satellite module on the side thereof opposite to the base module for completing a series circuit with the respective pairs of conductive strips and with the solid state charging means, one of the conductive strips in each pair of conductive strips having a pair of normally-closed resilient prongs, means for supporting the units on the respective modules, each unit having a rod member provided with respective contacts engaging between the resilient prongs in the respective module, and the respective contacts of each rod member being connected to the battery in the respective units, whereby the units are charged in a series circuit arrangement, and whereby any one of the units may be removed from its respective module without disturbing the series circuit arrangement.

13. The charging system of claim 11, further including means for storing an excess portion of the conductor cord means in the base member.

14. A multi-station modular module for charging a plurality of cordless tools, appliances, devices or other battery units from a power source, comprising a charger module, a line cord associated with the charger module, means for connecting the line cord to the power source, a solid state charging device electrically connected to the line cord and the power source and generating a plurality of charging pulses, first spring contact means carried by the charging module and connected to the solid state charging device, means on the charger module for supporting a first cordless device, said last-named means including means for electrically engaging the first spring contact means for charging the first cordless device, at least one satellite charger laterally of the charger module, means for mechanically supporting the satellite module on the charger module, second spring contact means carried by the satellite charger and engaging the first spring contact means in series, means for completing the series circuit, and means on the satellite module for supporting a second cordless device, said last-named means including means for electrically engaging the second spring contact means for charging the second cordless device.

15. A multi-station modular charger for charging a plurality of cordless tools, appliances, devices or other battery units, comprising a charger module, means for supporting the charger module on a wall or other surface, charging means associated with the charger module, a plurality of substantially-identical satellite modules, means for removably connecting one of the satellite modules to the charger module laterally thereof, means for removably securing the remaining satellite modules to each other and to the one satellite module and hence to the charger module, in sequence, and progressively laterally thereof in a direction away from the charger module, respective contact means in the charger module and in each of the satellite modules and including a respective pair of spring contacts normally engagine one another, means for connecting the respective contact means in series with each other as the satellite modules are connected sequentially to each other and to the charger module, means on the charger module and on the satellite modules, respectively, for supporting the respective cordless devices, a conductive means carried by each of the cordless devices and adapted to engage and to be received between the respective spring contacts in electrical engagement therewith when the respective cordless device is supported on the charger module or on one of the satellite modules, whereby the cordless devices may be charged simultaneously by the charging means, and whereby all of the cordless devices are charged in electrical series.

16. A multi-station modular charger for charging a plurality of cordless tools, appliances, devices or other battery units from a power source, comprising a plurality of modules, at least some of which are substantially identical, means for removably connecting the modules together in sequence, electrical contact means within each of the modules, means for serially connecting the respective electrical contact means as the modules are connected together, the adjacent modules having cooperating mechanical securing means adapted to engage each other as the respective electrical contact means are serially connected, charging means connected between the power source and the electrical contact means on at least one of the modules, means on each module for supporting a respective cordless device, each of the electrical contact means including a pair of normally-closed spring contacts, and conductive rod means carried by each of the cordless devices and adapted to engage and to be received between the respective spring contacts in electrical engagement therewith when the respective cordless device is supported on a selected one of the modules.

17. A multi-station modular charging system for charging a plurality of cordless tools, appliances, devices or other battery units from a power source, comprising a base module having a line cord connected to the power source, a charging device operatively associated with the base module, means on the base module for storing an excess portion of the line cord, means for supporting a first cordless device having a first electrically conductive means therein to carry d.c. charging current to at least one rechargeable battery therein on the base module, first electrical contact means in said base module for providing a conductive d.c. current path between the charging device and the first electrically conductive means in the first cordless device, a satellite module, means for mounting the satellite module on the charger module, second electrical contact means in the satellite module for providing a conductive d.c. current path, means for connecting the second electrical contact means in electrical series with the first electrical contact means and with the charging device operatively associated with the base module, means for supporting a second cordless device having a second electrically conductive means therein to carry d.c. charging current to at least one rechargeably battery therein, and electrical connection means within said base module and within said satellite module providing a series connection between the second electrical contact means within the satellite module and the second electrical contact means within the base module.

18. A module for a multi-station charging system for a cordless device or other battery unit, wherein the cordless device is provided with a handle, comprising a housing having outer walls including a front wall, a rear wall and a pair of side walls, the housing being formed by a pair of complementary mating portions joined together along a common mid-plane substantially parallel to the front and rear walls of the housing, a pair of contact strips within the housing substantially parallel to the mid-plane, the contact strips having respective portions extending beyond one of the side walls of the housing and being recessed within the other side wall, hook means separate from the extending portions of the contact strips and from the one side wall of the housing, the other side wall of the housing having recessed detent means formed therein for cooperative engagement with the hook means of an adjacent module, means for supporting the handle of the cordless device on the front wall of the housing, and means for making an electrical connection between the cordless device and at least one of the contact strips in the module.

19. A module for a multi-station charging system for a cordless device or other battery unit, comprising a housing having outer walls including a front wall, a rear wall and a pair of side walls, the housing being formed by a pair of complementary housing halves joined together along a common mid-plane substantially parallel to the front and rear walls of the housing, a pair of contact strips within the housing substantially parallel to the mid-plane and trapped between the complementary halves of the housing, the contact strips having respective portions extending beyond one of the side walls of the housing and being recessed within the other side wall, hook means separate from the extending portions of the contact strips and projecting from the one side wall of the housing, the other side wall of the housing having recessed detent means formed therein for cooperative engagement with the hook means of an adjacent module, means for supporting the cordless device on supporting the module housing, wherein the cordless device depends therefrom, and means for making an electrical connection between the cordless device and at least one of the contact strips in the module.

20. A multi-station charging system according to claim 1, wherein at least one of said modules is for a substantially cylindrical casing for a battery pack, the at least one module comprising a housing including a front wall, contact strips within the housing substantially parallel to the front wall, one of the contact strips comprising respective contact elements which are spring biased together into a normally closed position and constitute one of said normally closed pair of contacts, the front wall of the housing having a substantially scalloped recess for receiving the casing of the battery pack, the scalloped recess having a projecting boss formed therein, the boss having an opening therein communicating with the interior of the at least one module housing, the battery pack casing having a recess therein for receiving a boss on the at least one module, a rod carried by the battery pack casing disposed within the recess therein, and projecting through the boss to separate the normally closed elements of the contact strips in the housing, spaced contacts on the rod constituting a respective one of said electric contact means and engaging the respective contact elements, and means within the battery pack casing for electrically connecting the spaced contacts on the rod with the battery pack in the casing.

21. A module for a multi-station charging system for a cordless device, wherein the cordless device is provided with a battery pack forming a handle for the device, comprising a housing having outer walls including a front wall, a rear wall and a pair of side walls, the housing being formed by a pair of complementary housing halves joined together along a common mid-plane substantially parallel to the front and rear walls of the housing, a pair of contact strips within the housing substantially parallel to the mid-plane, the contact strips having respective portions extending beyond one of the side walls of the housing and being recessed within the other side wall, one of the contact strips comprising respective contact elements which are spring biased together into a normally closed position, the front wall of the housing having a substantially scalloped recess for receiving the battery pack, the scalloped recess having a projecting boss formed therein, the boss having an opening therein communicating with the interior of the module housing, the battery pack having a recess therein for receiving the boss on the module, a rod carried by the battery pack, disposed within the recess therein, and projecting through the boss to separate the normally closed elements of the contact strips in the housing, spaced contacts on the rod engaging the respective contact elements, means within the battery pack for electrically connecting the spaced contacts on the rod with the battery pack, hook means separate from the extending portions of the contact strips and projecting from the one side wall of the housing, and the other side wall of the housing having recessed detent means formed therein for cooperative engagement with the hook means of an adjacent module.

22. A multi-station charging system according to claim 1, wherein at least one of said modules is for a cordless device provided with a handle, the at least one module comprising a housing having outer walls including a front wall, a rear wall and a pair of side walls, the housing being formed by a pair of complementary mating portions joined together along a common mid-plane substantially parallel to the front and rear wall of the housing, a pair of contact strips withing the housing substantially parallel to the mid-plane and forming part of said electrically conductive series circuit, the contact strips having respective end portions constituting a respective one of said electric contact means recessed from one of the side walls of said housing adjacent a pair of slots in said one of said sidewalls vertically aligned substantially along the mid-plane, said one of said sidewalls having recessed detent means formed therein.

23. In a multi-station charging system for charging a plurality of units from an alternating current source, each of the units having at least one rechargeable battery therein, the combination of a plurality of charging stations arranged substantially adjacent to one another, normally closed electrical contact means in each of the charging stations, means for connecting the normally closed respective electrical contact means in all of the adjacent charging stations in an electrically conductive series circuit with each other, means operatively associated with one of the charging stations for connecting the electrically conductive series circuit including the respective electrical contact means therein to the current source, said last-named means including a solid-state charging device having a current regulating circuit and generating a series of current pulses, means on each of the charging stations for removably supporting a respective one of said plurality of units, and means on each unit for electrically connecting the respective battery therein within the electrically conductive series circuit and in series therewith and in series with other batteries within the series circuit.

24. The combination of claim 23, wherein each of the charging stations comprise a modular charger.

25. The combination of claim 23, wherein the charging stations are arranged laterally of one another.

26. The combination of claim 23, further including means for removably latching the charging stations together.

27. The combination of claim 23, wherein the charging device comprises an integrated circuit.

28. The combination of claim 23, wherein each of the units comprises a cordless battery-operated device having a substantially cylindrical handle, and wherein the means for removably supporting the cordless device comprises, each of the charging stations having a scalloped recess formed therein for receiving the handle of the cordless device, a protruding boss formed on the recess, and the handle having a complementary recess formed therein for receiving the boss.

29. The combination of claim 28, further including means for providing a detent "snap action" between the boss and the handle.

30. In a multi-station charging system for charging a plurality of units from an alternating current source, each of the units having a rechargeable battery therein, the combination of a plurality of charging stations arranged substantially adjacent to one another, electrical contact means in each of the charging stations, means for connecting the respective electrical contact means in the adjacent charging stations in a series circuit arrangement with each other, means on one of the charging stations for connecting the respective electrical contact means therein to the current source, said last-named means including a solid-state charging device having a current regulating circuit and generating a series of current pulses, means on each of the charging stations for removably supporting a respective unit, and means on each unit for electrically connecting the respective battery therein within the series circuit arrangement, wherein each of the units comprises a cordless battery-operated device having a substantially cylindrical handle, and wherein the means for removably supporting a respective unit comprises at each of the charging stations having a scalloped recess formed therein for receiving the handle of the cordless device and a protruding boss formed on the recess, the handle having a complementary recess formed therein for receiving the boss, and wherein the means on each unit for electrically connecting the respective battery therein within the series circuit arrangement comprises a rod carried by the handle within the recess therein, a pair of conductive strips on the rod, means for electrically connecting the respective battery between the pair of conductive strips, the electrical contact means in the respective charging station comprising a pair of substantially parallel conductive strips, one of the pair of strips comprising respective elements normally engaging one another and resiliently biased towards each other, and the rod being inserted between the respective elements such that the conductive strips on the rod engage the respective elements.

31. A multi-station modular charging system according to claim 1, wherein at least one of the modules has a protuberance thereon, the protuberance having an opening therein, electrical contact means within the one module, and wherein at least one of the units has a recess formed therein complementary to the protuberance, wherein the at least one unit substantially envelops the protuberance when in place and is in substantial mechanical registry therewith, and a contact carrying member within the at least one unit and extending through the opening in the protuberance to engage the at least one electrical contact means in the at least one of the modules.

32. The combination of claim 31, wherein the unit includes a generally cylindrical housing having a battery pack therein, and wherein the charger means has a face plate provided with a generally semi-cylindrical scalloped recess complementary to the housing for the battery pack.

33. In a charging system, the combination of a unit having a rechargeable battery therein, a charger means having a protuberance thereon, the protuberance having an opening therein, electrical contact means within the charger means, the unit having a recess formed therein complementary to the protuberance, wherein the unit substantially envelops the protuberance and is in substantial mechanical registry therewith, and a contact carrying member within the unit and extending through the opening in the protuberance to engage the contact means in the charger means, and wherein the contact means in the charger means comprises a pair of contact elements resiliently biased into a normally closed position, and wherein the contact carrying member within the unit comprises an extension member separating the normally-closed contact elements, the extension member carrying respective contact strips in engagement with the contact elements in the charger means.

34. In a charging system, the combination of a unit including a generally cylindrical housing having a battery pack therein, a charger means having a face plate provided with a generally semi-cylindrical scalloped recess complementary to the housing for the battery pack, a protuberance in the recess of the charging means, the protuberance having an opening therein, electrical contact means within the charger means and including a pair of contact elements resiliently biased into a normally closed position, the unit having a recess formed therein complementary to the protuberance, wherein the unit substantially envelops the protuberance, and a contact-carrying extension member within the unit and extending through the opening in the protuberance, the extension number carrying respective contact strips in engagement with the contact elements in the charger means.

* * * * *